W. G. HAYNES.
EXPANSIBLE PLUG FOR WELLS.
APPLICATION FILED NOV. 29, 1918. RENEWED APR. 12, 1920.
1,388,564.
Patented Aug. 23, 1921.
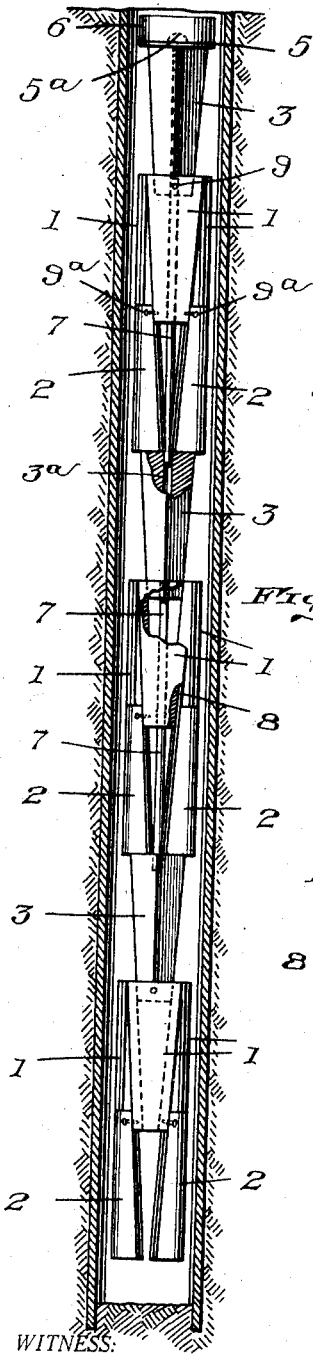
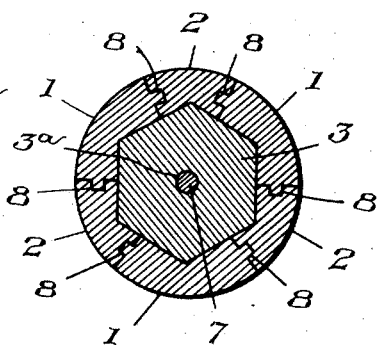
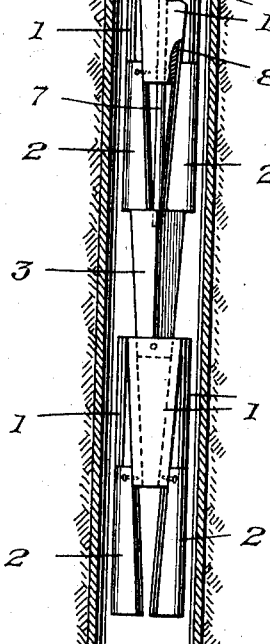
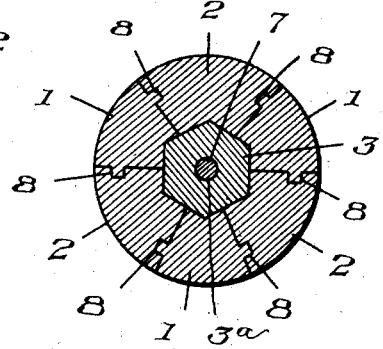
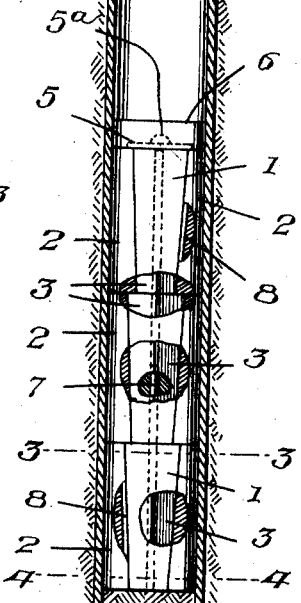
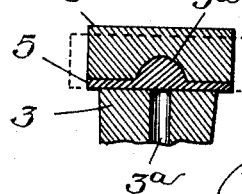
Fig. 1. Fig. 2. Fig. 3. Fig. 4. Fig. 5.
WITNESS: Thos. W. Riley
INVENTOR. William G. Haynes
BY Alexander Sewell
ATTORNEYS

UNITED STATES PATENT OFFICE.

WILLIAM G. HAYNES, OF COFFEYVILLE, KANSAS, ASSIGNOR OF ONE-HALF TO FRED E. REMINGTON, OF COFFEYVILLE, KANSAS.

EXPANSIBLE PLUG FOR WELLS.

1,388,564.  Specification of Letters Patent.  Patented Aug. 23, 1921.

Application filed November 29, 1918, Serial No. 264,628. Renewed April 12, 1920. Serial No. 373,389.

*To all whom it may concern:*

Be it known that I, WILLIAM G. HAYNES, a citizen of the United States, residing at Coffeyville, in the county of Montgomery and State of Kansas, have invented certain new and useful Improvements in Expansible Plugs for Wells; and I hereby declare that the following is a full, clear, and exact description thereof, reference being had to the accompanying drawings, which form part of this specification.

This invention is an expansible plug for use in plugging driven or bored wells, such as oil wells, gas wells and the like, and the object of the invention is to provide a plug which can be readily inserted into a well and when positioned therein can be expanded so as to securely close the well and which plug is constructed in such manner that if there should be slight projections or knobs on the side walls of the bore of the well or hole, or pockets therein, at the point where the plug is located, the plug nevertheless would make a tight closure. For this purpose the plug is made in a plurality of expansible cylindric sections, and if one of the sections comes opposite such a projection or recess in the bore the sections above or below such projection or recess will securely close the bore, whereas a straight sided solid plug would be forced over to one side of the bore by such projection and leave a space beside the projection where liquid could ooze past the plug; and members of sectional plugs as heretofore made would be apt to catch in recesses in the side walls of the bore and spoil the plug. These possibilities have been serious practical defects in the majority of plugs now on the market.

In the accompanying drawings I have illustrated one practical form of plug embodying the invention and will explain the same with reference thereto, and set forth in the claims the essential features and combinations of parts in the plug wherein the invention resides and for which protection is desired.

In said drawings:

Figure 1 is a side view of the plug extended and inserted into a well, parts of the plug being partly in section.

Fig. 2 is a similar view showing the plug closed and expanded.

Fig. 3 is an enlarged transverse section on the line 3—3, Fig. 2.

Fig. 4 is a similar section on the line 4—4, Fig. 2.

Fig. 5 is an enlarged section through the metal packing.

The plug, as shown, is composed of three or more similar telescopic sections. Each section comprises a core or wedge pin 3 and a plurality of alternating, segmental tapered sections or staves 1 and 2, which are preferably made of wood and when each set of staves is properly assembled they together with the wedge pin form a complete solid cylinder.

The staves 1 are tapered from top to bottom, being narrower at bottom; while staves 2 are tapered oppositely to the staves 1, being narrow at top and wider at bottom.

These staves 1 and 2 are preferably provided with grooves in their meeting edges into which grooves are fitted tongues or fillers 8, which are also preferably made of wood; and in this way I produce a sliding tongue and groove engagement between the edges of the adjacent staves in all positions thereof.

The staves 1 and 2 are also preferably tapered, so that they are thinner, in a radial direction, at top than at bottom; and they are also preferably longitudinally angularly chamfered, as shown, so that when the staves are assembled their interior faces correspond with the exterior surface of the polygonal-sided wedge pin.

The wedge pin 3 is tapered from top to bottom being smaller at bottom and is adapted to be engaged with the interior oppositely tapered and grooved surfaces of the staves.

As stated a plurality of such similar sections are used in making a complete plug, the sections being arranged end to end, and before the plug is inserted into the well each section is extended so as to elongate the plug and reduce it in diameter.

To elongate the plug the wedge pin 3 of each section is drawn outwardly from between the stave sections 1 and 2 thereof; and the stave sections 2 are drawn outwardly from between the sections 1, in a direction away from the wedge pin, to the position indicated in Fig. 1. When thus extended the staves 1 of each section are tacked to the lower end of the wedge pin 3 thereof by brads, indicated at 9 (Fig. 1) or other suitable means, which will hold these parts in position but permit them to be forcibly telescoped under sufficient pressure. Also the upper ends of the staves 2 may be tacked to the lower ends of the staves 1 by brads, as indicated at 9ª, (Fig. 1). In this manner, as indicated in Fig. 1, each section of the plug is extended so that its members are in position to telescope each other when pressure is applied thereto; and when the plug is compressed longitudinally the parts of the sections will telescope and expand the sections as indicated in Fig. 2.

When the plug sections are extended as indicated in Fig. 1 the diameter of the plug is reduced owing to the natural contraction of the parts due to the tapered faces and edges thereof as described and shown. The wedge pins of adjacent sections are connected by a dowel pin 7, the ends of which may be fastened in the ends of bores or sockets 3ª in the wedge pins.

When the plug is extended, as shown in Fig. 1, such dowel pins 7 hold the several sections in position and cause them to telescope properly when the plug is compacted.

When it is desired to use the plug, the sections are extended and the staves tacked to the wedge pins and to each other as indicated in Fig. 1 so that they will remain in extended position while the plug is being lowered into position in the well, the metal plate and lead packing being on top of the uppermost wedge pin.

After the plug is lowered into position it is compacted or hammered down, by the usual means, so that the parts of each section are telescoped together; and in telescoping, owing to the tapered shape of the staves and plug, each section expands, and becomes firmly wedged in position. When the plug is compacted it is materially shortened and expanded in diameter as indicated in Fig. 2. The tacks or brads holding the parts in expanded position yield and are displaced when the plug is compacted.

The iron cone fastened on top of the plug causes the lead packing to spread laterally under pressure, after the plug is expanded, and make a tightly sealed closure. The dowel pins connecting the sections of the plug render the plug pliable and easily driven.

The several sections of the plug are expanded in a measure independently, and if one section should be laterally displaced by reason of projections on the side walls of the well the other sections could expand fully and tightly close the well.

I preferably make each section of the plug with six staves which give it great flexibility and facilitate and insure close fitting of the plug sections when compacted in the bore of the well.

The polygonal sided wedge pin 3 is important, as the staves are angularly channeled on their inner sides to fit the angles of the pin, and this fit remains constant at all relative longitudinal positions of the staves and wedge pin, so that the fit of the staves against the wedge pin is as close when they contact with the small end thereof as when they contact with the large end thereof. By reason of this construction a perfect fit is maintained at all times between wedge pin and staves. The hexagonal wedge pin and the angular grooves in the staves also assist in maintaining the tongued and grooved staves in engagement with each other and insure a close fit thereof to the pins at all points.

Another advantageous feature is the tongue and groove connection between the sides of the staves. These tongues keep the staves engaged at all times and prevent their dropping or projecting outwardly into pockets, or recesses in the sides of the bore, which are found in almost every well bore; and but for these tongues, when the plug was located and being compacted, some of the staves would be apt to swing out into such pockets and thereby disarrange the plug parts and cause the plug to break apart and become a practically useless mass of crushed wood instead of an expanded solid plug.

On the upper end fo the uppermost wedge pin 3 is secured a metal plate or disk 5 which has a central conical protuberance 5ª, and upon this place and over the protuberance is placed a body of lead or other soft metal packing 6.

The short dowel pins used to connect the several sections are partially withdrawn from the sockets in the wedge pins when the sections of the plug are extended and are telescoped into the sockets in the wedge pins when the plug is driven and compacted; but the dowel pins are small and light and if any such pin should not telescope properly it would simply be crushed between the sections, and would not prevent the expansion of the telescopic sections of the plug.

Another important feature is having the lead packing and the iron cone on top of the plug. In this position the cone will cause the lead to spread out when hammered and seal the well perfectly. Where the lead is placed at the bottom of a plug, as heretofore, it has nothing beneath it to make it spread; and cannot be properly flattened out, when placed under the wooden plug, as the wood plug could be mashed out of all shape while the lead would remain about the same shape as when first attached to the plug and would not close the well; and the mass of crushed wood above the lead would not cut off water or oil; but in my invention the lead being on top of the wood plug will be directly struck by the hammer and spread out and pack perfectly and easily.

What I claim is:

1. An expansible plug for wells, comprising a telescopic section composed of a polygonally sided wedge pin or core and a plurality of oppositely tapered staves encircling the wedge pin and having angular grooves on their inner side faces fitting the angular faces of the wedge pin.

2. An expansible plug for wells, comprising a telescopic section composed of a central tapered wedge pin or core polygonal in cross section, and oppositely tapered telescopic staves adapted to surround the core, and having angular grooves fitted to the angular facets of the wedge, and tongue and groove connections between the edges of adjacent staves.

3. An expansible plug for wells, comprising a plurality of telescopic sections, each having a polygonally sided wedge pin or core and a plurality of oppositely tapered staves encircling the wedge pin and having angular grooves on their inner faces fitting the angular faces of the wedge pin, substantially as described.

4. An expansible plug for wells, comprising a plurality of similar sections, each having a central tapered wedge pin or core polygonal in cross section, and oppositely tapered telescopic staves adapted to surround the core, and having angular grooves fitted to the angular facets of the wedge pin; and dowel pins connecting adjacent wedge pins when the core or plug is extended, substantially as described.

5. An expansible plug for wells, comprising a plurality of telescopic sections each having a polygonally sided wedge pin or core and a plurality of oppositely tapered staves encircling the wedge pin and having angular grooves on their inner faces fitting the angular faces of the wedge pin; tongue and groove connections between the edges of adjacent staves; and dowel pins connecting adjacent wedge pins when the plug is extended, substantially as described.

6. In combination with an expansible plug for wells, a metal cap on top thereof and a soft metal packing on said cap adapted to be spread when hammered down thereupon, substantially as described.

7. The combination with an expansible plug for wells, of a metal cap having a conical spreader, and a soft metal packing on said cap adapted to be spread by the spreader when hammered down thereupon, substantially as described.

8. An expansible plug for wells having a central tapered wedge pin or core and oppositely tapered telescopic staves adapted to surround the core, and tongue and groove connections between the edges of adjacent staves, substantially as described.

9. An expansible plug for wells comprising a plurality of telescopic sections, each having a tapered wedge pin or core and a plurality of oppositely tapered staves encircling the wedge pin; tongue and groove connections between the edges of adjacent staves; and dowel pins connecting adjacent wedge pins when the plug is extended, substantially as described.

10. An expansible plug for wells, comprising a telescopic section composed of a polygonally sided wedge pin or core and a plurality of oppositely tapered staves encircling the wedge pin and having angular grooves on their inner side faces fitting the angular faces of the wedge pin; a metal cap having a conical spreader and a soft metal packing on said cap adapted to be spread by the spreader when hammered down thereupon, substantially as described.

11. An expansible plug for wells, comprising a telescopic section composed of a central wedge pin and oppositely tapered telescopic staves adapted to surround the pin, and tongue and groove connections between the edges of adjacent staves.

In testimony that I claim the foregoing as my own, I affix my signature.

WILLIAM G. HAYNES.